(12) United States Patent
Keshavan et al.

(10) Patent No.: US 10,186,287 B2
(45) Date of Patent: Jan. 22, 2019

(54) SPLIT-SHAFT PIVOT FOR A DUAL-ACTUATOR HARD DISK DRIVE

(71) Applicant: Western Digital Technologies, Inc., San Jose, CA (US)

(72) Inventors: Manoj Keshavan, San Jose, CA (US); Jung-Seo Park, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/616,845

(22) Filed: Jun. 7, 2017

(65) Prior Publication Data

US 2018/0358039 A1    Dec. 13, 2018

(51) Int. Cl.
G11B 5/48    (2006.01)
G11B 5/55    (2006.01)

(52) U.S. Cl.
CPC .......... *G11B 5/4813* (2013.01); *G11B 5/5521* (2013.01); *G11B 5/5578* (2013.01)

(58) Field of Classification Search
None
See application file for complete search history.

(56) References Cited

U.S. PATENT DOCUMENTS

| | | | |
|---|---|---|---|
| 4,984,115 A | 1/1991 | Takahashi et al. | |
| 5,666,242 A | 9/1997 | Edwards et al. | |
| 5,761,007 A | 6/1998 | Price et al. | |
| 5,914,837 A | 6/1999 | Edwards et al. | |
| 5,920,441 A | 7/1999 | Cunningham et al. | |
| 5,930,071 A | 7/1999 | Back | |
| 6,005,743 A | 12/1999 | Price et al. | |
| 6,191,924 B1 | 2/2001 | Koester | |
| 6,256,173 B1 | 7/2001 | Chee et al. | |
| 6,449,130 B1 | 9/2002 | Koyama | |
| 6,480,363 B1 | 11/2002 | Prater | |
| 6,490,138 B1 | 12/2002 | Prater | |
| 6,560,075 B2 | 5/2003 | Price et al. | |
| 6,603,640 B1 | 8/2003 | Prater et al. | |
| 6,687,092 B2 | 2/2004 | Kan et al. | |

(Continued)

OTHER PUBLICATIONS

Dual Actuator tuned mass damper pivot bearing, IP.com database, original publication date: Feb. 1, 2000, included in prior art database: Jun. 18, 2003, 2 pages, IP.com disclosure No. IPCOM000013589D, IP.com I, LLC.

*Primary Examiner* — Craig A. Renner
(74) *Attorney, Agent, or Firm* — John D. Henkhaus

(57) ABSTRACT

A split-shaft pivot assembly for a dual-actuator data storage device may include a first pivot shaft having a threaded stud extending from one end and an attachment flange at the other end, and a second pivot shaft having a threaded bore at one end a structurally equivalent attachment flange at the other end, where the two pivot shafts are attached to each other by threading the stud into the bore. A first bearing assembly may be affixed with a first preload around the first pivot shaft, and a second bearing assembly may be affixed with a second different preload around the second pivot shaft. The pivot assembly may further include an elastomeric damper positioned within an annular groove formed in, and around the threaded stud of, the first pivot shaft. Such features may serve to inhibit and/or damp transmission of vibrational energy among the actuators through the shared split-shaft.

22 Claims, 7 Drawing Sheets

(56) References Cited

U.S. PATENT DOCUMENTS

| | | |
|---|---|---|
| 6,747,836 B2 | 6/2004 | Stevens et al. |
| 6,847,504 B1 | 1/2005 | Bennett et al. |
| 6,961,212 B1 | 11/2005 | Gustafson et al. |
| 7,428,125 B2 | 9/2008 | Deguchi et al. |
| 7,469,463 B2 | 12/2008 | Prater et al. |
| 7,513,030 B2 | 4/2009 | Aoyagi et al. |
| 7,649,288 B1 | 1/2010 | Brown |
| 7,750,520 B2 | 7/2010 | Smirnov et al. |
| 2002/0149884 A1 | 10/2002 | Price et al. |
| 2003/0156358 A1* | 8/2003 | Jeong .................. G11B 33/08 360/265.6 |
| 2004/0095672 A1 | 5/2004 | Price |
| 2005/0248877 A1* | 11/2005 | Kim .................. G11B 5/5521 360/97.11 |

* cited by examiner

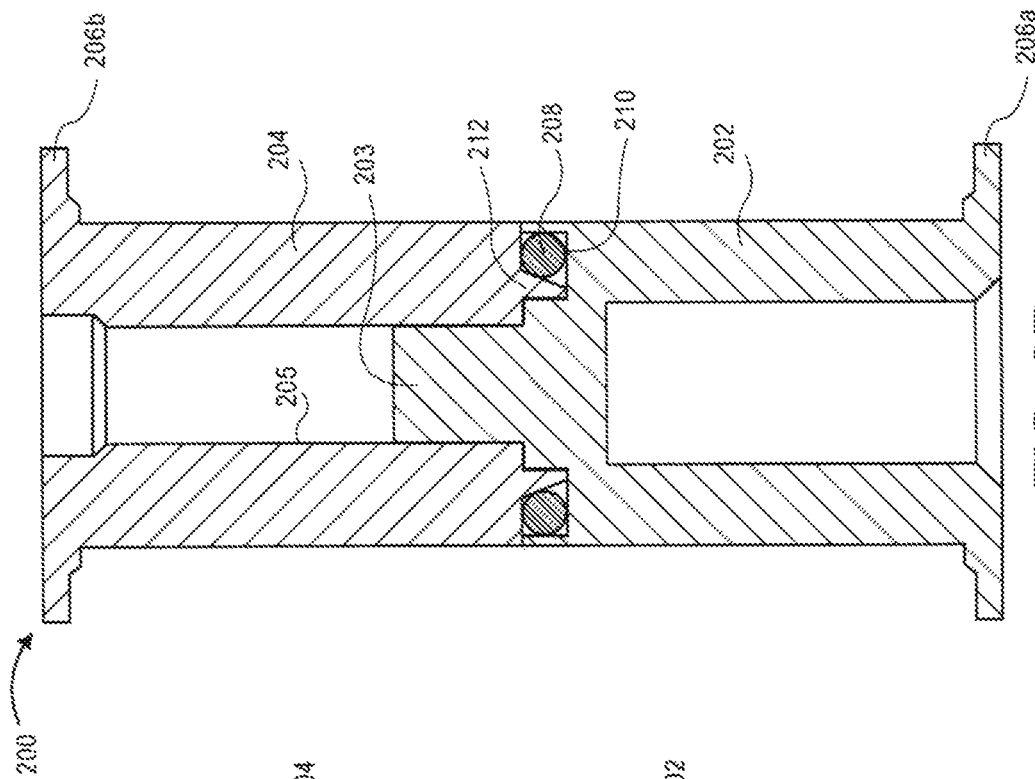
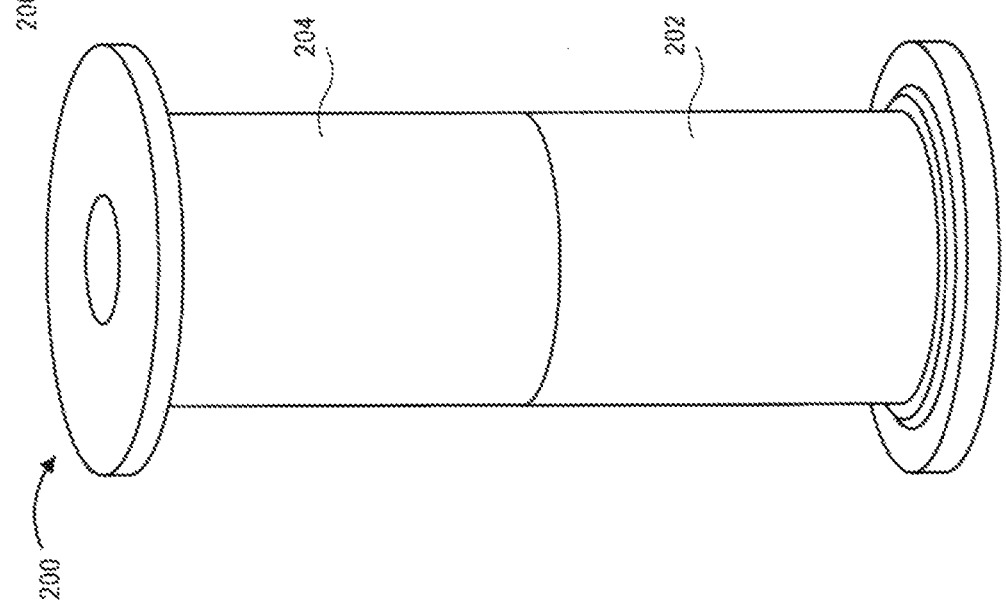
FIG. 3B
FIG. 3A

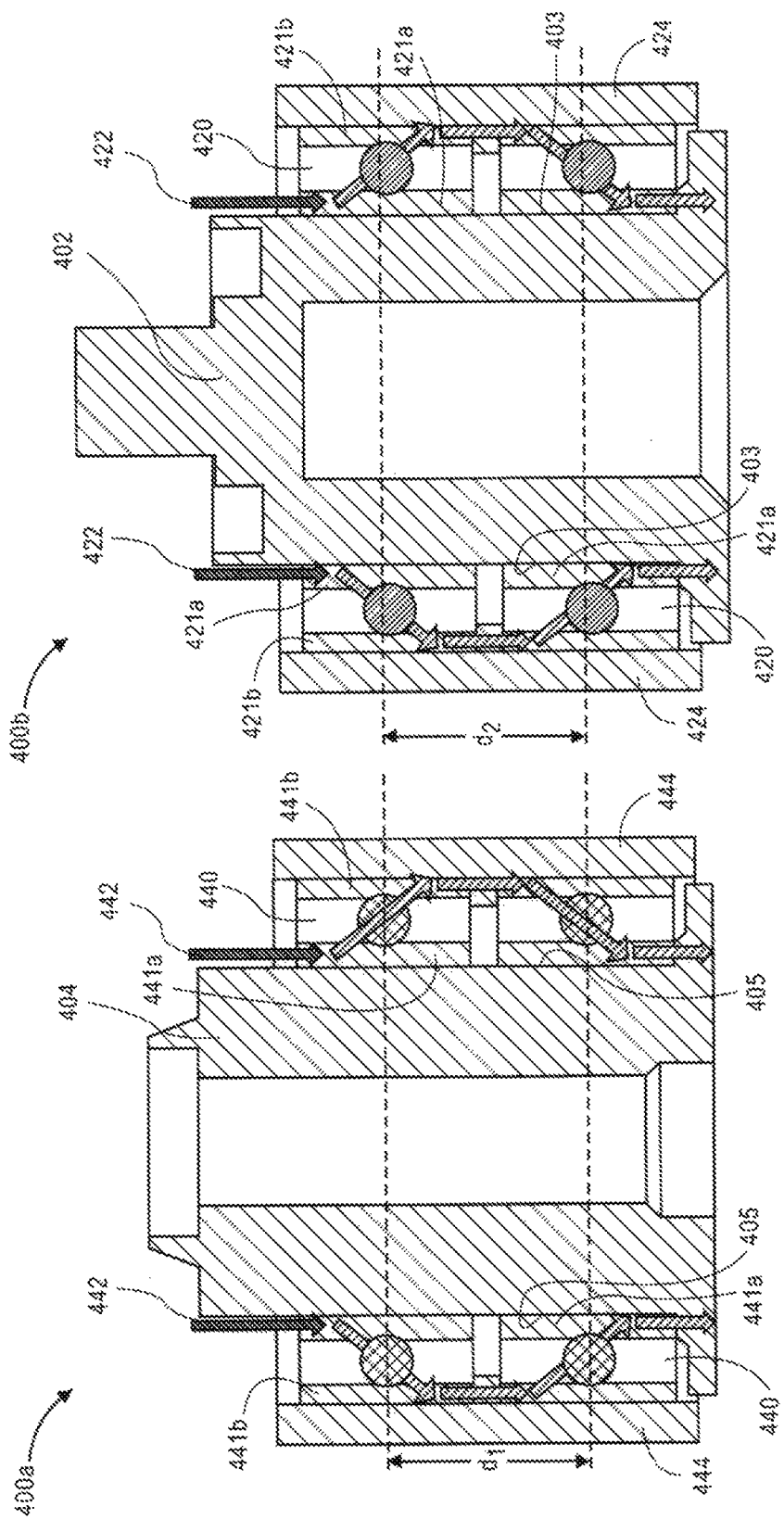

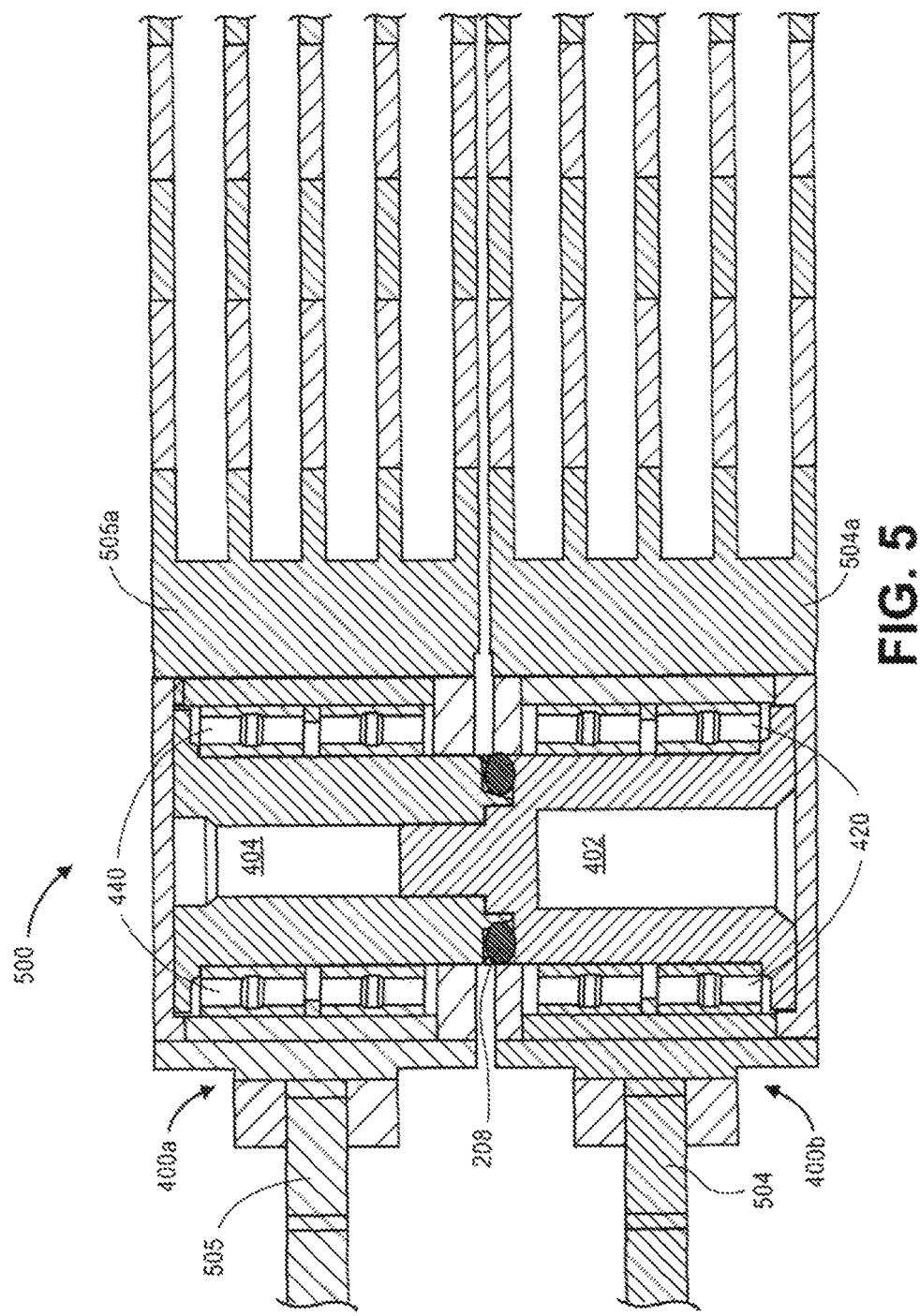

SPLIT-SHAFT PIVOT FOR A DUAL-ACTUATOR HARD DISK DRIVE

FIELD OF EMBODIMENTS

Embodiments of the invention may relate generally to data storage devices such as hard disk drives, and particularly to managing transmission of vibration in a dual-actuator disk drive utilizing a split-shaft pivot.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current n the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. This has led to the need to develop and implement various means to increase HDD performance.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3A is a perspective view illustrating the split-shaft pivot shaft of FIG. 2A in assembled form, according to an embodiment;

FIG. 3B is a cross-sectional side view illustrating the split-shaft pivot shaft of FIG. 3A, according to an embodiment;

FIG. 4A is a cross-sectional side view illustrating an upper pivot bearing assembly, according to an embodiment;

FIG. 4B is a cross-sectional side view illustrating a lower pivot bearing assembly, according to an embodiment;

FIG. 5 is a cross-sectional side view illustrating a split-shaft pivot assembly with dual actuators assembled thereon, according to an embodiment.

DETAILED DESCRIPTION

Generally, approaches to managing vibration associated with a dual-actuator split-shaft pivot shaft are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a digital data storage device (DSD), such as a hard disk drive (HDD). Thus, in accordance with an embodiment, a plan view illustrating an HDD 100 is shown in FIG. 1 to illustrate an exemplary operating context.

Figure 1:
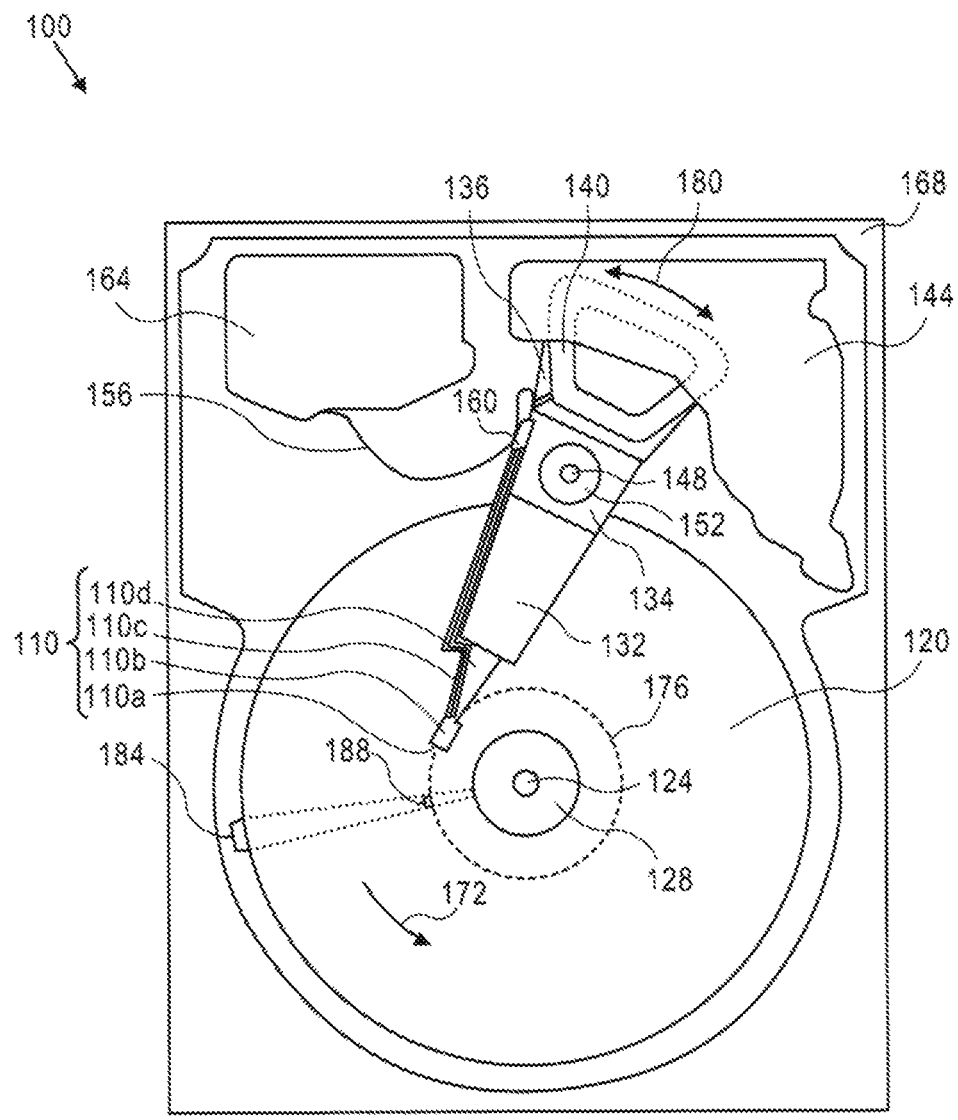
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM)

to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Recall the observation that the performance of high-capacity HDDs has not scaled up commensurately with increases in storage capacity. This IOPs/TB (referred to as "IOPs density") deficit stands in the way of widespread adoption of such HDDs. In other words, the high latencies of large capacity HDDs in a clustered environment, such as in data centers with multiple clustered nodes, limits their appeal due to slower access to stored data. The pressure to increase the performance (e.g., IOPs/TB) by reducing the latencies for data operations of high-capacity HDDs has become even stronger in view of the market penetration that solid-state storage continues to achieve.

One possible approach to increasing HDD performance is the implementation of multi-actuator systems, in which multiple independently operating actuators are assembled onto a single shared pivot shaft in order to independently and concurrently read from and/or write to multiple recording disks of a disk stack. However, the operation of multiple actuators on a shared pivot shaft can structurally couple the vibration modes of the independently operating actuators, leading to the transfer of vibrational energy between actuators by way of the shared shaft. That is, operation (i.e., rotary movement) of one actuator generates forces that transfer via the shared shaft to the other actuator(s). This vibration transferred to the other actuator(s) affects the ability of the corresponding read-write transducer (or "head") to efficiently arrive at and to stay on-track, resulting in excessive track mis-registration ("TMR"). TMR limits the performance of HDDs in that an inordinate amount of time is expended trying to position and maintain the head well-centered over a data track (e.g., via servoing). The corresponding read and write operations are effectively delayed as a result, thus reducing overall I/O performance.

The number of actuators that may be assembled onto a shared pivot shaft may vary from implementation to implementation; however, an exemplary but non-limiting dual-actuator arrangement is described throughout herein.

Damping of Coupled System Modes of a Dual-Actuator Split-Shaft Actuator System

One challenge with vibration transmission alluded to above pertains to reducing the structural dynamics coupling of actuator system modes between the two actuator systems. According to an embodiment, one approach to reducing the dynamic coupling gain between actuator systems in a dual-actuator configuration is to utilize a dissipative element between the two actuator systems. A split-shaft design enables the incorporation of damping element(s) between the pair of shafts of a two-piece shaft assembly. This aids in damping out vibration modes that transmit energy by way of deformation of the pivot shaft, such as during operation and/or during shock events. However, while increasing the dissipative aspect, use of damper(s) in the direct path between the pair of shafts can reduce the interface stiffness significantly. To overcome this, a parallel arrangement of stiffness components (pivot shafts with metal-to-metal contact) and damping components (energy absorbing materials) is used.

Figure 2A:
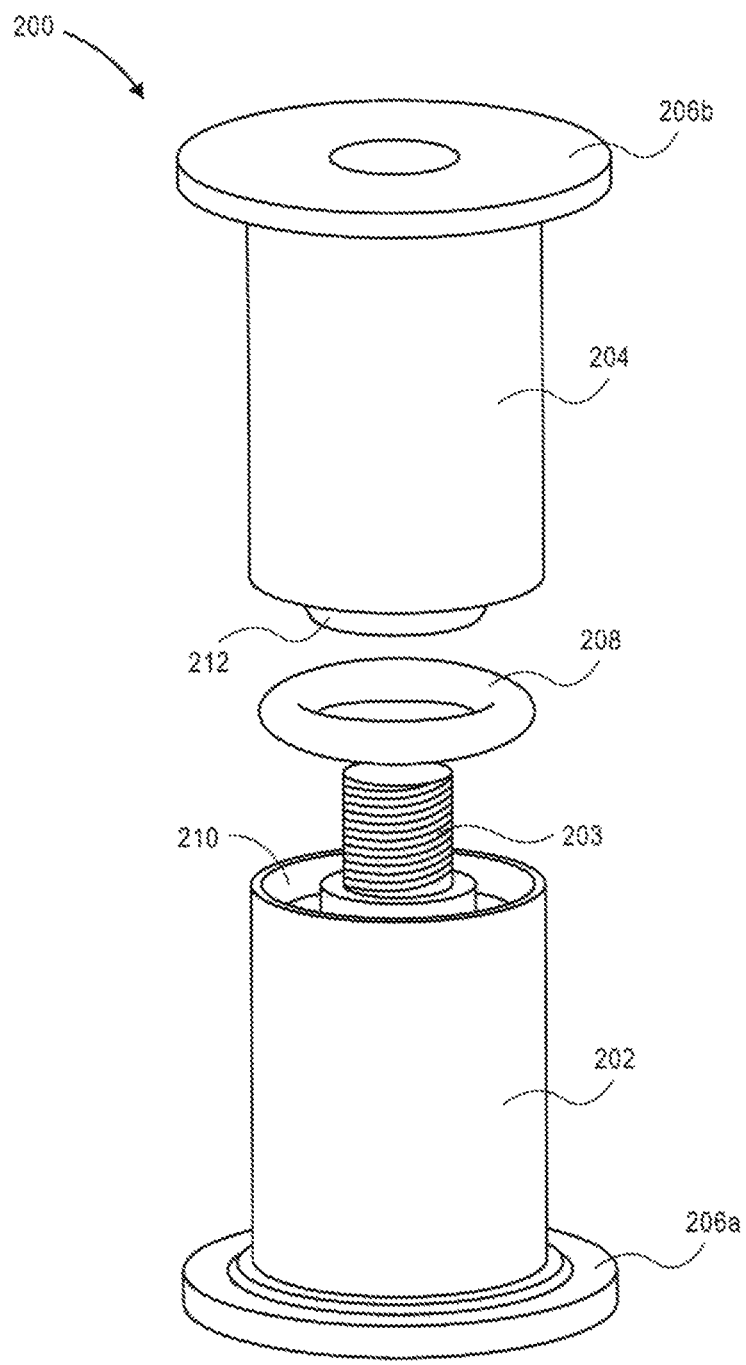
FIG. 2A is an exploded perspective view illustrating a split-shaft pivot shaft, according to an embodiment.
Figure 2B:
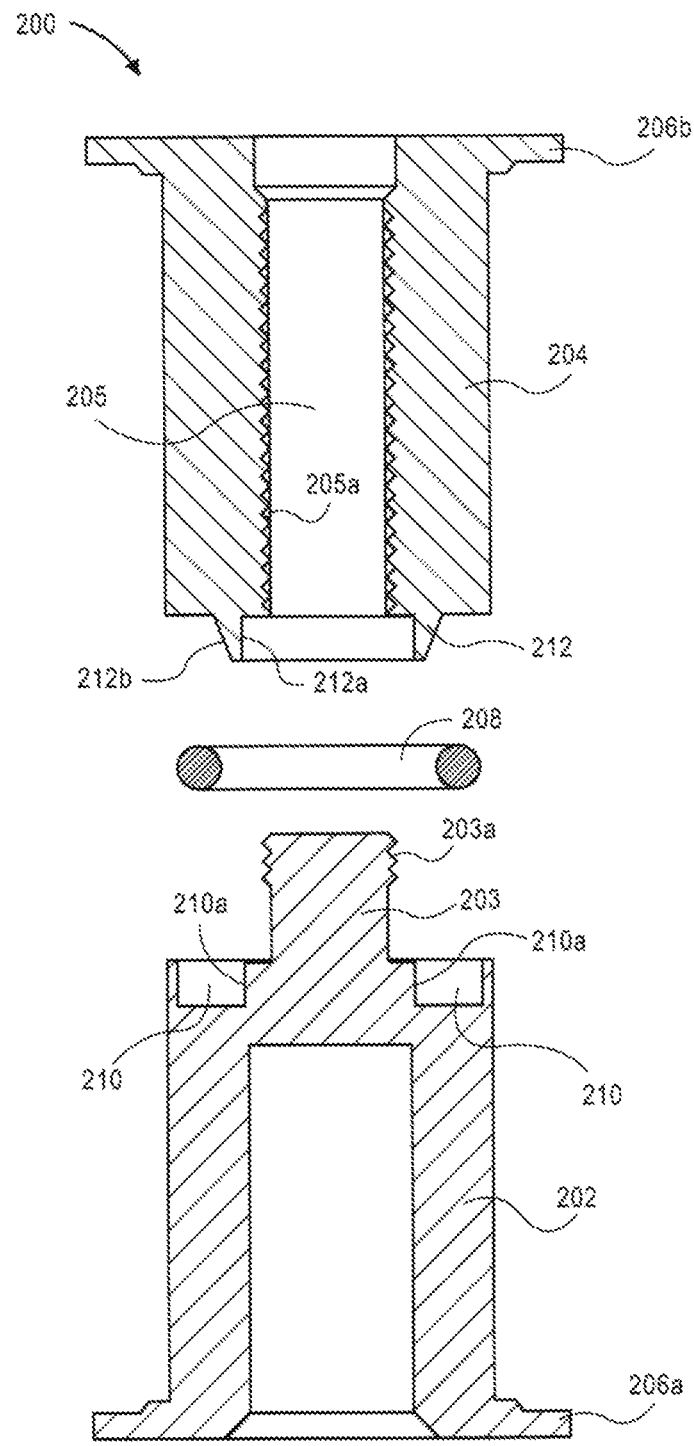
FIG. 2B is an exploded cross-sectional side view illustrating the split-shaft pivot shaft of FIG. 2A, according to an embodiment.

FIG. 2A is an exploded perspective view illustrating a split-shaft pivot shaft, and FIG. 2B is an exploded cross-sectional side view illustrating the split-shaft pivot shaft of FIG. 2A, according to an embodiment. An actuator pivot assembly, such as actuator pivot assembly 200, may be implemented for use in a data storage device, such as a multi-actuator hard disk drive (HDD).

According to an embodiment, actuator pivot assembly 200 (or "split-shaft assembly") comprises a first (e.g., lower) pivot shaft 202 part and a second (e.g., upper) pivot shaft 204 part. The first pivot shaft 202 and the second pivot shaft 204 are intended for coupling together as a split-shaft assembly or unit, e.g., for enabling a dual-actuator system. To that end, and according to an embodiment, the first pivot shaft 202 comprises a threaded stud 203, including a threaded outer diameter or surface, extending from one end and an attachment flange 206a at the other end. Likewise, the second pivot shaft 204 comprises a threaded bore 205, including a threaded inner diameter or surface, at one end and an attachment flange 206b at the other end. Thus, the first and second pivot shafts 202, 204 may be coupled, attached, structurally mated together by way of the threads 203a, 205a or threaded structures, i.e., the threaded stud 203 of the first pivot shaft 202 can be threaded or screwed into the threaded bore 205 of the second pivot shaft 204. An alignment feature to ensure structural alignment (e.g., axial concentricity) of the first and second pivot shafts 202, 204 during assembly is described elsewhere herein.

According to an embodiment, the attachment flange 206a and the attachment flange 206b are (substantially) structurally equivalent or structurally symmetric. Thus, when the first pivot shaft 202 (which may be internally threaded) is coupled with an HDD enclosure base (e.g., base or housing 168 of FIG. 1) with support from the lower attachment flange 206a, and the second pivot shaft 204 is coupled with an HDD cover with support from the upper attachment flange 206b, a higher degree of stiffness symmetry can be achieved at the base and cover interfaces as compared to using asymmetric flanges. Such stiffness symmetry of the attachment boundaries can assist with inhibiting undesirable modes, such as tilt modes of the actuators, where the displacement gain at the head 110a (FIG. 1) varies depending on the position in the HSA.

According to an embodiment, the first pivot shaft 202 further comprises an annular groove 210 (slot, channel) extending axially into the first pivot shaft 202 and surrounding the threaded stud 203, and the second pivot shaft 204 comprises an annular alignment structure 212 extending from and around an entrance to or entry area of the threaded bore 205. According to an embodiment, the alignment structure 212 comprises an annular tapered wedge structure including an inner surface 212a and a tapered surface 212b, where the inner surface 212a structurally mates with a corresponding inner surface 210a of the annular groove 210 of the first pivot shaft 202, to substantially ensure concentricity of the first and second pivot shafts 202, 204 during assembly.

FIG. 3A is a perspective view illustrating the split-shaft pivot shaft of FIG. 2A in assembled form, and FIG. 3B is a cross-sectional side view illustrating the split-shaft pivot shaft of FIG. 3A, according to an embodiment.

According to an embodiment, the actuator pivot assembly 200 further comprises a damping mechanism or damper 208 positioned within the annular groove 210, and which is compressed at least in part by the annular tapered wedge structure of alignment structure 212 extending into the annular groove 210 upon structural mating of the threaded stud 203 with the threaded bore 205. Thus, the damper 208 is pre-compressed during actuator system assembly (where FIG. 3B is intended to depict the damper 208 in such a pre-compressed state) to provide damping of major resonant modes during actuator operation and/or damping during a shock event. According to an embodiment, the damper 208 is composed of an elastomeric material. An appropriate elastomeric material may be selected based on, for non-limiting examples, desired damping characteristics over a desired frequency range and temperature range (e.g., based on loss factor), cleanliness requirements (e.g., considering outgassing), elasticity (e.g., based on shear modulus), and the like. Such an elastomeric damper 208 may serve to dissipate energy from deformation (e.g., bending) of the pivot shaft 200 in response to operational vibrational forces and shock events, for example. According to an embodiment, the damper 208 comprises an elastomeric O-ring.

Decoupling Vibration Modes of a Dual-Actuator Split-Shaft Actuator System

One challenge with vibration transmission alluded to above pertains to the coupling of actuator system modes, e.g., when primary butterfly modes of the individual actuators overlap, or are in close proximity to one another. Typically, a butterfly mode involves significant deformation of the arms of the E-block, coil and pivot bearing assembly, with all the arms moving in phase with one another. In scenarios where respective butterfly mode resonant frequencies of each actuator system (considered separately) are clustered together, the modes couple and assume a global or extended form. Vibrational energy is then efficiently transmitted from one actuator to the other at these "combined system" resonant frequencies. This scenario would play out in cases in which one actuator is seeking, while the other actuator is transferring data from/to disk. The actuator that is seeking would excite the combined system modes and increase the vibration level in the actuator transferring data, leading to a detrimental effect on system performance. Further, in those scenarios where the butterfly mode resonant frequencies of the individual actuator systems (considered separately) are close, a "beating" phenomenon could also occur between the now global (extended) modes of the combined system of actuators. The resulting motion can expose the actuator transferring data to/from disk to sudden excursions leading to off-track writes (poor data integrity) or degraded read performance.

According to an embodiment, one approach to managing or controlling the dynamic coupling of primary system modes between actuators in a dual-actuator system is to employ a split-shaft assembly, and to separate or increase the separation between the dominant system modes. This has the effect of reducing the gains in the coupling transfer function. This may be achieved, in part, by utilizing different pivot bearing preloads on each of the bearing systems, thereby manifesting as a different stiffness for each of the pivot bearing systems.

FIG. 4A is a cross-sectional side view illustrating an upper pivot bearing assembly, according to an embodiment. Upper pivot shaft 404 may be configured with similar features as described herein in reference to pivot shaft 204 (FIGS. 2A-3B). Hence, reference is made to the illustrations and descriptions corresponding to pivot shaft 204 for an understanding of like features of upper pivot shaft 404, i.e., features for which descriptions are not necessarily repeated here in reference to FIG. 4A. An actuator pivot assembly, such as upper pivot assembly 400a, may be implemented for use in a data storage device, such as a multi-actuator hard disk drive (HDD).

FIG. 4B is a cross-sectional side view illustrating a lower pivot bearing assembly, according to an embodiment. Lower pivot shaft 402 may be configured with similar features as described herein in reference to pivot shaft 202 (FIGS. 2A-3B). Hence, reference is made to the illustrations and descriptions corresponding to pivot shaft 202 for an understanding of like features of lower pivot shaft 402, i.e., features for which descriptions are not necessarily repeated here in reference to FIG. 4B. An actuator pivot assembly, such as lower pivot assembly 400b, may be implemented for use in a data storage device, such as a multi-actuator hard disk drive (HDD).

Upper pivot assembly 400a comprises an upper bearing assembly 440, having a bearing preload 442 applied thereto, affixed around the upper pivot shaft 404. Similarly, lower pivot assembly 400b comprises a lower bearing assembly 420, having a bearing preload 422 applied thereto, affixed around the lower pivot shaft 402. However, according to an embodiment, bearing preload 422 and bearing preload 442 are different, i.e., bearing preload 422 and bearing preload 442 have different values. For example, upper bearing assembly 440 may have an inner race 441a or races attached to the outer surface 405 of the upper pivot shaft 404, and lower bearing assembly 420 may have an inner race 421a or races attached to the outer surface 403 of the lower pivot shaft 402, depending on a desired manufacturing process associated with assembling a dual-actuator split-shaft assembly. Note that each of the upper bearing assembly 440 and the lower bearing assembly 420, and like bearings referenced herein, may be configured as bearing assemblies comprising multiple bearings (for a non-limiting example, each bearing assembly may comprise two ball bearings, as depicted).

The manner in which preload 422 and preload 442 are applied may vary from implementation to implementation, with some non-limiting procedures known in the art. For a non-limiting example, an axial load (depicted as the uppermost block arrow of preload 422, 442) may be applied to the inner race 421a, 441a of a bearing (e.g., the uppermost bearing) of the bearing assembly 420, 440, while supporting the flange region of the shaft 402, 404. The corresponding outer race 421b, 441b is affixed to an outer bearing sleeve 424, 444, whereby the applied load is transmitted through (depicted as cross-hatched arrows) that bearing to the other bearing (e.g., the lower bearing) of the bearing assembly 420, 440.

FIG. 5 is a cross-sectional side view illustrating a split-shaft pivot assembly with dual actuators assembled thereon, according to an embodiment. Actuator system 500 comprises the lower pivot shaft 402 (same as or similar to first pivot shaft 202 of FIGS. 2A, 2B, 3A, 3B) and the upper pivot shaft 404 (same as or similar to second pivot shaft 204 of FIGS. 2A, 2B, 3A, 3B). According to an embodiment, the split-shaft assembly of lower pivot shaft 402 and upper pivot shaft 404 is utilized as a pivot shaft, or part of an actuator pivot assembly or shared shaft assembly, for multiple actuators constituent to a multi-actuator split-shaft data storage device such as a hard disk drive (HDD). As such, actuator system 500 comprises (a) the lower shaft 402, around which a first or lower rotary actuator assembly 504 (e.g., a voice coil actuator, and including a carriage 504a, such as carriage 134 of FIG. 1) is rotatably coupled, with a lower bearing assembly 420 interposed therebetween, and (b) the upper shaft 404, around which a second or upper rotary actuator assembly 505 (e.g., a voice coil actuator, and including a carriage 505a, such as carriage 134 of FIG. 1) is rotatably coupled, with an upper bearing assembly 440 interposed therebetween.

Returning to the concept of differential preloading of bearing assemblies for a dual-actuator split-shaft actuator system such as actuator system 500, preloading a bearing assembly affects the contact angle(s) corresponding to the balls and races of a given bearing, which in turn affects the relative stiffness of the bearing (e.g., radial and axial stiffness). The stiffness of each bearing assembly 420, 440 is a characteristic of, or affects, the stiffness of the actuator system, e.g., actuator assembly 504 and actuator assembly 505, with which each bearing assembly 420, 440 is coupled. A relatively higher preload 422, 442 (FIGS. 4A, 4B) produces a relatively stiffer actuator assembly, while a relatively lower preload 422, 442 produces a relatively less stiff actuator assembly. Hence, effectively and collectively "tuning" the preload 422, 442 associated with each respective bearing assembly 420, 440 is akin to tuning the relative stiffness of each actuator assembly 504, 505 of actuator system 500, which locally and particularly affects the vibration modes of each actuator assembly 504, 505. Generally, a relatively higher bearing preload/stiffness may result in a relatively higher frequency butterfly mode of vibration, while a relatively lower bearing preload/stiffness may result in a relatively lower frequency butterfly mode of vibration.

Thus, one can appreciate that judicious selection of an appropriate preload 422, 442 (FIGS. 4A, 4B) for each bearing assembly 420, 440 can serve to move apart the respective structural resonance modes of the actuator assemblies 504, 505. In view of the aforementioned deleterious effects, e.g., on the operating performance of a corresponding hard disk drive, that the coupling of actuator system modes between the actuator assemblies may have when the modes overlap or are in close proximity to each other, one can further appreciate that moving apart the respective structural resonance modes may be effective in inhibiting the transmission of vibrational energy from one operating actuator assembly to the other actuator assembly in a dual-actuator split-shaft actuator system such as actuator system 500. Experimentation has shown that a non-trivial reduction in the coupling transfer function gains of actuator assembly/system vibration modes may be achieved by separating their resonant frequencies, which in turn can serve to combat excessive track mis-registration (TMR) within a corresponding hard disk drive.

Furthermore, the techniques described herein may be implemented using equivalent or substantially identical bearing assemblies 420, 440, but for their respective preloads 422, 442 (FIGS. 4A, 4B), and/or substantially identical bearing mechanisms within each bearing assembly 420, 440, according to embodiments. Still further, the preload techniques described herein may be implemented independently for each of the upper pivot assembly 400a (FIG. 4A) and the lower pivot assembly 400b (FIG. 4B), and checks instituted by way of resonance monitoring to ensure the correct bearing stiffness of each bearing assembly 420, 440. By contrast, a single shaft design would likely need to be cured sequentially after each preload application, and ensuring that the upper and lower bearing assemblies have the desired stiffness would be more challenging to ascertain. Thus, manufacturing process times would be longer, which leads to higher large-scale manufacturing costs.

While the foregoing differential bearing preloading is at least in part directed to moving apart the respective structural resonance modes of the actuator assemblies 504, 505, such as the butterfly mode frequencies, the rocking or tilt modes of the actuator assemblies 504, 505 may also be a concern. With further reference to FIGS. 4A and 4B, upper pivot assembly 400a comprises a bearing span or spacing $d_1$ and lower pivot assembly 400b comprises a bearing span or spacing $d_2$, where $d_1$ and $d_2$ represent the distance between the bearings in each respective bearing assembly 440, 420. The rocking/tilt and butterfly modes of the actuator assemblies 504, 505 are effectively the same if the actuators and pivot bearings, including each bearing span, are identical and the boundary conditions (attach points of the pivot to the base and cover) are substantially the same. Hence, if the modes are at the same frequencies for the lower and upper actuator assemblies 504, 505, then they couple strongly. According to an embodiment, bearing spacing $d_1$ of bearing assembly 440 is different from bearing spacing $d_2$ of bearing assembly 420. Similar to implementing different bearing preloads to advantageously affect the respective butterfly modes, one can appreciate that judicious selection of an appropriate bearing spacing $d_1$, $d_2$ for each bearing assembly 440, 420 can serve to move apart the respective structural resonance modes of the actuator assemblies 504, 505, such as the rocking/tilt mode frequencies.

Method for Manufacturing an Actuator Pivot Assembly

Figure 6:
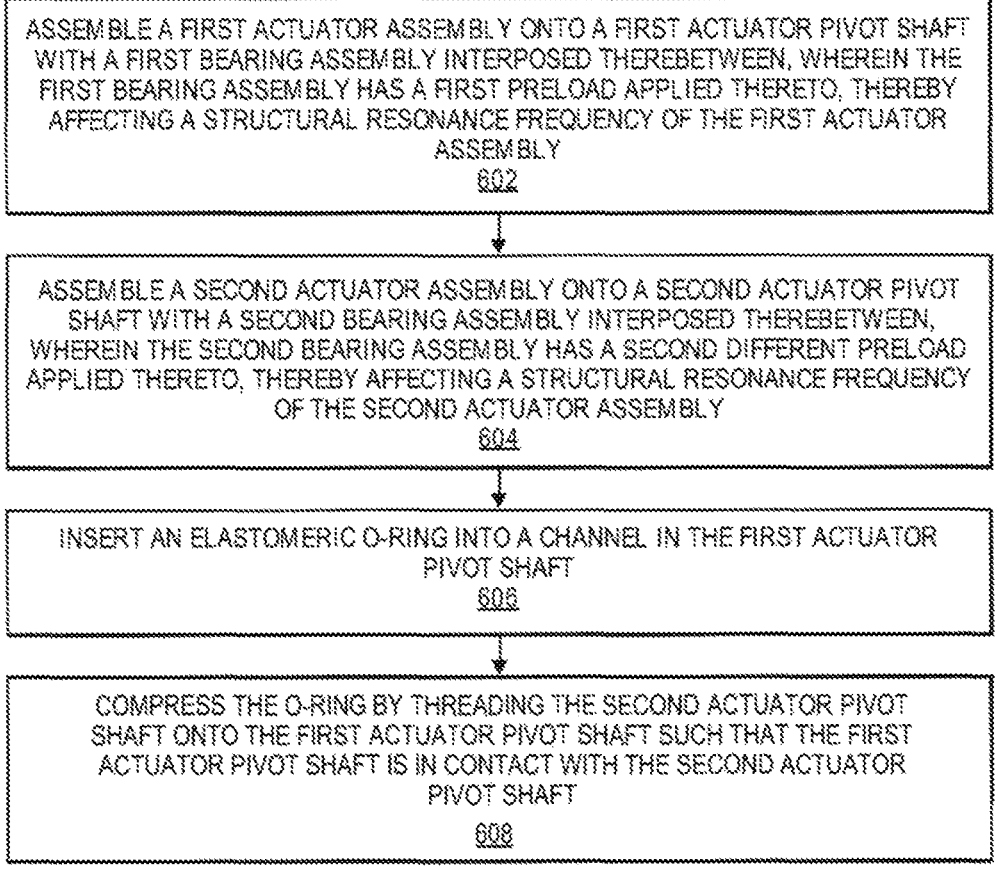
FIG. 6 is a flow diagram illustrating a method for manufacturing an actuator pivot assembly, according to an embodiment.

FIG. 6 is a flow diagram illustrating a method for manufacturing an actuator pivot assembly, according to an embodiment. For example, the method of FIG. 6 could be employed to manufacture an actuator system for a dual-actuator split-shaft hard disk drive (HDD), such as actuator system 500 illustrated and described in reference to FIG. 5.

At block 602, a first actuator assembly is assembled onto a first actuator pivot shaft, with a first bearing assembly interposed therebetween, where the first bearing assembly has a first preload applied thereto, which affects the structural resonance frequency of the first actuator assembly. For example, actuator assembly 504 (e.g., a voice coil actuator, and including an E-block carriage 504a, such as carriage 134 of FIG. 1) is rotatably coupled with a pre-assembled lower pivot assembly 400b (FIG. 4B) comprising the lower pivot shaft 402 and the bearing assembly 420 that has been preloaded with a corresponding particular preload 422.

At block 604, a second actuator assembly is assembled onto a second actuator pivot shaft, with a second bearing assembly interposed therebetween, where the second bearing assembly has a second different preload applied thereto, which affects the structural resonance frequency of the second actuator assembly. For example, actuator assembly 505 (e.g., a voice coil actuator, and including an E-block carriage 505a, such as carriage 134 of FIG. 1) is rotatably coupled with a pre-assembled upper pivot assembly 400a (FIG. 4A) comprising the upper pivot shaft 404 and the bearing assembly 440 that has been preloaded with a corresponding particular preload 442 that is different from the particular preload 422. Actuator assembly 505 may be the same substitutable sub-component as actuator assembly 504. Bearing assembly 440 may be constructed with the same substantially identical bearing mechanisms as in the same sub-component of bearing assembly 420. Additionally, or alternatively, the bearing assembly 420 may comprise a bearing span $d_2$ and the bearing assembly 440 may comprise a bearing span $d_1$ that is different from the first bearing span.

As described herein, judicious selection of an appropriate preload 422, 442 for each bearing assembly 420, 440 can serve to move apart the respective structural resonance modes of the actuator assemblies 504, 505 (such as the butterfly mode frequencies) such that the transmission of vibrational energy from one actuator assembly 504, 505 to the other actuator assembly, and any associated deleterious effects due to mode coupling, in a dual-actuator split-shaft actuator system such as actuator system 500 is inhibited.

According to an embodiment, at optional block 606, an elastomeric O-ring is inserted into a channel in the first actuator pivot shaft. For example, an O-ring implementation of damper 208 (FIGS. 2A, 2B, 3B, 5) may be inserted into the annular groove 210 (FIGS. 2A, 2B, 3B) of lower pivot shaft 202 (FIGS. 2A, 2B, 3B. Continuing to optional block 608, the O-ring is compressed by threading the second actuator pivot shaft onto the first actuator pivot shaft, such that the two shafts are in physical contact with one another. For example, the O-ring implementation of damper 208 is compressed by threading threaded bore 205 (FIG. 2B) of upper pivot shaft 204 (FIGS. 2A, 2B, 3B) or 404 onto the threaded stud 203 (FIG. 2B) of lower pivot shaft 202 (FIGS. 2A, 2B, 3B) or 402), the effect of which is described elsewhere herein.

Extensions and Alternatives

While embodiments, techniques and approaches are described herein throughout in the context of a dual-actuator system, it is contemplated and one can appreciate that these embodiments, techniques and approaches may be similarly applied to and implemented in multi-actuator systems, generally. That is, the number of actuators or actuator assemblies in a multi-actuator system in which the described embodiments, techniques and approaches may be implemented is not limited to two.

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive actuator pivot assembly comprising:
    a first pivot shaft comprising:
        a threaded stud extending from one end, and
        an attachment flange at another opposing end;
    a second pivot shaft comprising:
        a threaded bore at one end, and
        an attachment flange, structurally equivalent to said attachment flange of said first pivot shaft, at another opposing end;
        wherein said first pivot shaft is attached to said second pivot shaft by structurally mating said threaded stud with said threaded bore.

2. The hard disk drive actuator pivot assembly of claim 1, wherein:
    said first pivot shaft further comprises an annular groove extending axially into said first pivot shaft and surrounding said threaded stud;
    said second pivot shaft comprises an annular alignment structure extending from and around an entry area of said threaded bore, wherein said alignment structure comprises:
        an inner surface structurally mated with a corresponding inner surface of said annular groove, and
        a tapered surface; and
    said actuator pivot assembly further comprises:
        a damper positioned within said annular groove and compressed in part by said alignment structure extending into said annular groove by mating of said threaded stud with said threaded bore.

3. The hard disk drive actuator pivot assembly of claim 2, further comprising
    a first bearing assembly, with an applied first bearing preload, affixed around said first pivot shaft; and
    a second bearing assembly, with an applied second bearing preload, affixed around said second pivot shaft;
    wherein said first and second bearing preloads are different.

4. The hard disk drive actuator pivot assembly of claim 3, wherein each of said first bearing assembly and said second bearing assembly comprises a pair of substantially identical bearing mechanisms.

5. The hard disk drive actuator pivot assembly of claim 4, wherein said first bearing assembly comprises a first bearing span and said second bearing assembly comprises a second bearing span that is different from the first bearing span.

6. The hard disk drive actuator pivot assembly of claim 4, further comprising:
    a first voice coil actuator assembly rotatably coupled to said first pivot shaft with said first bearing assembly interposed therebetween; and
    a second voice coil actuator assembly rotatably coupled to said second pivot shaft with said second bearing assembly interposed therebetween.

7. A hard disk drive comprising the actuator pivot assembly of claim 1.

8. The hard disk drive of claim 7, wherein said attachment flange of said first pivot shaft is positioned at an interface with a hard disk drive enclosure base.

9. A hard disk drive dual-actuator split-shaft assembly comprising:
    a lower actuator assembly coupled with a lower shaft of said split-shaft assembly;
    an upper actuator assembly coupled with an upper shaft of said split-shaft assembly;
    means for damping transmission of vibrational energy between said lower and upper actuator assemblies through said lower and upper shafts; and
    means for separating a butterfly mode resonant frequency corresponding to said lower actuator assembly from a butterfly mode resonant frequency corresponding to said upper actuator assembly.

10. A data storage device comprising:
    a plurality of recording disk media rotatably mounted on a spindle;
    a first head slider comprising a read-write transducer configured to read from and to write to one disk media of said plurality of disk media;
    a first rotary actuator assembly configured to move said first head slider to access portions of said one disk media;
    a first shaft part around which said first rotary actuator assembly is rotatably coupled;
    a second head slider comprising a read-write transducer configured to read from and to write to another disk media of said plurality of disk media;
    a second rotary actuator assembly configured to move said second head slider to access portions of said another disk media; and
    a second shaft part, coupled via threads with said first shaft part, and around which said second rotary actuator assembly is rotatably coupled.

11. The data storage device of claim 10,
    wherein said first shaft part comprises an outer-diameter threaded stud extending from one end;
    wherein said second shaft part comprises an inner-diameter threaded bore;
    wherein said first and second shaft parts are coupled via mating of said threaded stud with said threaded bore.

12. The data storage device of claim 10, further comprising:
    an enclosure base;

wherein said first shaft part comprises a lower flange that supports attachment of said first shaft part with said base;

wherein said second shaft part comprises an upper flange that supports attachment of said second shaft part within said device, wherein said upper flange is structurally symmetric with said lower flange.

13. The data storage device of claim 10, wherein said first shaft part comprises an outer-diameter threaded stud extending from one end and an annular slot surrounding said threaded stud;

wherein said second shaft part comprises an inner-diameter threaded bore and an annular tapered wedge structure extending from and around an entrance to said threaded bore;

wherein said first and second shaft parts are coupled via mating of said threaded stud with said threaded bore; and wherein said data storage device further comprises;

an elastomeric O-ring positioned within said annular slot of said first shaft part and compressed in part by said annular tapered wedge of said second shaft part extending into said annular slot by mating of said threaded stud with said threaded bore.

14. The data storage device of claim 10, further comprising a first bearing assembly, with a first bearing preload applied, interposed between said first shaft part and said first rotary actuator assembly; and a second bearing assembly, with a second bearing preload applied, interposed between said second shaft part and said second rotary actuator assembly;

wherein said first bearing preload is different from said second bearing preload.

15. The data storage device of claim 14, wherein said first bearing preload corresponds to a first structural resonance mode of said first rotary actuator assembly and said second bearing preload corresponds to a second structural resonance mode of said second rotary actuator assembly, and wherein said first bearing preload and said second bearing preload are such that a first frequency corresponding to said first structural resonance mode is separated from a second frequency corresponding to said second structural resonance mode.

16. The data storage device of claim 14, wherein each of said first bearing assembly and said second second bearing assembly comprises a pair of equivalent bearings.

17. The data storage device of claim 16, wherein said first bearing assembly comprises a first bearing spacing and said second bearing assembly comprises a second bearing spacing that is different from the first bearing spacing.

18. A method for inhibiting transmission of vibration between a first actuator assembly and a second actuator assembly each of which is coupled with a split-shaft pivot in a data storage device, the method comprising:

providing means for separating a butterfly mode resonant frequency corresponding to said first actuator assembly from a butterfly mode resonant frequency corresponding to said second actuator assembly.

19. The method of claim 18, further comprising:

providing means for damping transmission of vibrational energy between said first and second actuator assemblies through said split-shaft pivot.

20. A method for manufacturing an actuator pivot assembly, the method comprising:

assembling a first actuator assembly onto a first actuator pivot shaft with a first bearing assembly interposed therebetween, wherein said first bearing assembly has a particular first preload applied thereto, thereby affecting a structural resonance frequency of said first actuator assembly; and assembling a second actuator assembly onto a second actuator pivot shaft with a second bearing assembly interposed therebetween, wherein said second bearing assembly has a particular second intentionally different preload applied thereto, thereby affecting a structural resonance frequency of said second actuator assembly.

21. The method of claim 20, further comprising:

inserting an elastomeric O-ring into a channel in said first actuator pivot shaft; and compressing said O-ring by threading said second actuator pivot shaft onto said first actuator pivot shaft such that the first actuator pivot shaft is in contact with the second actuator pivot shaft.

22. The method of claim 20, wherein assembling said first actuator assembly includes assembling said first bearing assembly comprising a first bearing span and assembling said second actuator assembly includes assembling said second bearing assembly comprising a second bearing span that is different from the first bearing span.

* * * * *